United States Patent [19]

Ross

[11] Patent Number: 4,976,873
[45] Date of Patent: Dec. 11, 1990

[54] PULSING PORTIONS OF A FILTER CELL TO EXTEND A FILTER RUN

[75] Inventor: David S. Ross, Lorain, Ohio

[73] Assignee: Zimpro/Passavant Inc., Rothschild, Wis.

[21] Appl. No.: 450,934

[22] Filed: Dec. 14, 1989

[51] Int. Cl.⁵ ............................................. C02F 1/00
[52] U.S. Cl. .................................. 210/744; 210/108; 210/264; 210/795
[58] Field of Search ............... 210/104, 264, 277, 744, 210/793–795, 108

[56] References Cited

U.S. PATENT DOCUMENTS

| Re. 28,456 | 7/1975 | Ross | 210/80 |
| 3,459,302 | 8/1969 | Ross | 210/796 |
| 3,516,930 | 6/1970 | Ross | 210/694 |
| 3,587,861 | 6/1971 | Ross | 210/277 |
| 3,792,773 | 2/1974 | Ross | 210/779 X |
| 3,817,378 | 6/1974 | Ross | 210/744 |
| 3,840,117 | 10/1974 | Ross | 210/794 |
| 4,032,443 | 6/1977 | Ross | 210/795 |
| 4,627,923 | 12/1986 | Ross | 210/744 |
| 4,693,831 | 9/1987 | Garzonetti | 210/744 |
| 4,818,414 | 4/1989 | Ross | 210/744 |
| 4,859,330 | 8/1989 | Pauwels | 210/264 |

Primary Examiner—Charles Hart
Attorney, Agent, or Firm—Tipton L. Randall

[57] ABSTRACT

An improved method for operating a down-flow granular medium filter is disclosed which increases the effective filtration time between backwashes. The filter tank cell is divided into a plurality of subcells, each individually adapted and controlled for periodic intermittent upwardly-directed pulses of fluid passed through the filter bed within each subcell from an array of orifices beneath or in the bed. During the filtration run, one subcell is pulsed to improve the porosity of that portion of the filter bed while the remainder of the subcells continue to filter wastewater. After initiation of the first pulsing cycle for a subcell, additional subcell pulsing cycles are initiated sequentially. At the end of the filtration run the whole filter cell is backwashed to remove particulate matter from the bed and prepare the bed for the next filtration run.

20 Claims, 10 Drawing Sheets

PULSING PORTIONS OF A FILTER CELL TO EXTEND A FILTER RUN

BACKGROUND OF THE INVENTION

1. Field of the Invention

This invention relates to the art of filtering particulate solids and other deleterious matter from liquids, and more specifically, to an improved method for improving the filtering capacity of a granular medium filter such as a sand filter. Very effective wastewater filters have been developed and described in applicant's prior U.S. Pat. Nos. 3,459,302; 3,516,930; 3,587,861; 3,792,773; 3,817,378; 3,840,117; 4,032,443; 4,627,923; 4,818,414 and Re. 28,458. These patents are incorporated by reference herein to the general art to which the present invention is directed.

2. Information Disclosure Statement

Granular medium filters such as sand filters are widely used to remove particulate material and other deleterious matter from wastewaters, potable water supplies, and the like. Such filters trap fine particulate matter within the interstices of the filtering medium, while particles larger in size than the interstices are separated as a layer on the filter medium surface. Eventually, the flow of water through the filter bed is hindered by these trapped and separated solids so that the liquid level above the bed rises. This increased resistance to the movement of liquid through the filter medium bed is a result of reduction in porosity of the bed medium.

The trapped and separated materials are removed periodically by stopping the flow of influent water and backwashing the filter bed with previously-filtered water. The filter normally is backwashed when resistance to flow through the filter bed results in the liquid above the filter bed rising to a predetermined level.

Extending the filtration time between backwashing has several advantages. First, the total quantity of solids loaded onto the filter bed between backwashes is increased. With a constant volume of backwash water, the solids concentration in the backwash water is increased. This reduces the overall hydraulic load placed on subsequent backwash water treatment equipment. Normally backwash water is recycled to the head end of a treatment plant, adding to the hydraulic load and solids load of the plant. Reducing the backwash frequency results in a reduced hydraulic load to the plant although the solids load from the filter backwash remains unchanged. The backwash water is more easily treated when it comprises a small volume containing concentrated solids. This is best accomplished by increasing the solids capture with resultant longer filter runs between backwashes. Second, downtime is minimized, thus maximizing effective filtration time.

Several methods have been used to prolong the filter run length between backwashes, without using additional filter area. Ross U.S. Pat. No. 3,459,302 discloses a granular medium filter in which currents are created in the liquid above the filter bed surface by an air diffuser. These currents sweep across the surface, removing solids trapped at the medium surface, and maintain them in suspension in the liquid above the filter surface. This technique to increase filter capacity and filter bed porosity is termed "air scour".

Another very effective means for reducing the frequency of backwashing is described in Ross U.S. Pat. No. 3,817,378. In this reference, at the time filter bed porosity decreases due to separated solids, and liquid accumulates above the filter bed, volumes of air are forced upward through the medium in intermittent pulses of short duration. Some variations of this procedure are known as "air pulse". A portion of the filtered solids is forced into liquid suspension above the filter bed, while another portion is concentrated by surface medium movement into localized sites within the bed itself. Thus, some of the solids are "stored" within the filter bed, reducing the quantity of solids which produce the flow resistance at the bed surface. This filter cleaning operation is generally repeated a number of times between backwashes, greatly extending the filtration time before backwashing is required.

The quantity of filtered solids which may be stored in the bed without adversely affecting the filtration rate is considerable, but limited. This generally restricts the numb of pulses which may be advantageously performed between backwashes.

A variation of the "air scour" and "air pulse" design is disclosed in Ross U.S. Pat. No. 4,627,923. A plurality of hydraulic jets within the filter bed employ filtered liquid to pulse the granular bed medium. Hydraulic jets above the filter bed also create currents in the liquid to maintain solids in suspension during the filter run.

Garzonetti, in U.S. Pat. No. 4,693,831, discloses a method for controlling the pulsing of a granular medium filter based on determination of the rise rate of liquid level above the filtration medium. Either air or liquid is used to pulse the filter bed.

In U.S. Pat. No. 4,859,330 Pauwels discloses a traveling bridge device with air scour and backwash means for successively cleaning each of a plurality of filter cells formed in a filtration tank.

As currently practiced, the "air scour" system or the "above bed hydraulic jet" system are activated when the liquid level above the filter bed rises to activate a first level detector. This detector is generally situated at a low position in the filter tank. Activation of either of these systems results in removing some of the solids from the filter surface and suspension of these solids in the liquid above the filter bed. As additional solids accumulate on and in the filter bed, the liquid level above the bed rises further to activate a second level detector. The second detector activates the "air pulse" or hydraulic jet pulse system. The "air pulse" or hydraulic jet pulse system results in volumes of air or liquid being forced upward through the medium in intermittent pulses of short duration. A portion of the filtered solids is forced into liquid suspension, while another portion is concentrated by surface medium movement into localized sites within the bed itself. Thus, some of the solids are "stored" within the filter bed, reducing the quantity of solids which produce the flow resistance at the bed surface. Additional pulses are initiated on a timed and timely basis at preset intervals of a few to many minutes, depending upon the expected solids loading and hydraulic loading.

Backwashing is typically initiated when a third level detector, located at a level higher than the first and second level detectors in the filter tank, is activated by the rising liquid level. Influent wastewater flow ceases and filtrate is forced up through the filter medium bed at a fluidizing or sub-fluidizing velocity. The backwash water carries the collected particles out of the filter cell, and generally back to the head of the treatment plant. The backwash flow ceases and the washed granular medium settles back to form a filter bed and another filtration cycle commences.

For the above described granular medium filters, the filter cell is a unit capable of individual operation to perform the described filtration process. Although not limited in dimensions, the cell generally ranges in size from 4 ft.×5 ft. (20 ft$^2$) to 30 ft.×50 ft. (1500 ft$^2$) and is equipped with pumps, valves, piping and controls to operate independently. Commonly, a number of filter cells operate in parallel to accept continuous flow from a treatment plant. One or more filter cells may be undergoing backwash or be closed for service while the remaining cells continue to filter the wastewater.

During the period of the air pulse or jet pulse in a filter cell, downward flow through the filter medium is temporarily retarded, and the liquid level over the medium bed will rise. The rate of rise is a function of the rate of inflow to the filter cell. For example, with an influent flow rate to a filter cell of approximately 7.5 gallons/min/ft$^2$, the rate of level rise is approximately 12 inches per minute. A pulse period 30 seconds in length results in the liquid level rising 6 inches. This level rise may not be recovered during the period subsequent to the pulse period, should the influent rate be very high. The liquid level may be raised even further by subsequent pulse cycles, and prematurely activate the backwash cycle. To overcome this problem several modifications to the filter systems described above have been invented.

SUMMARY OF THE INVENTION

The present invention is an improved method for operating a down-flow granular medium filter. The effective filtration time between backwashes is increased, and the quantity of backwash water requiring treatment is reduced. This invention is applicable to filters which are adapted for periodic backwashing and for multiple intermittent upwardly-directed pulses of fluid at times other than during backwash. Such filters include a granular medium filter bed with an upper and lower surface. The bed is in a filter tank cell which permits a head of liquid to accumulate above the bed. The filter tank cell is divided into a plurality of subcells, each subcell individually adapted and controlled for periodic upwardly-directed pulses of fluid passed through the filter bed within each subcell from an array of orifices beneath or in the bed.

The influent liquid from which particulate solids are to be removed is continuously introduced into the filter tank cell for downward solids-removing passage through the filter bed.

The liquid level or head above the filter bed within the tank cell rises to a pulse cycle initiating level. This activates a pulsing cycle for one of the subcells, comprising upwardly-directed multiple pulses of a fluid through that portion of the filter bed within that subcell. The pulsing cycle dislodges solids from that portion of the upper surface of the bed, stores filtered solids within that portion of the bed, while the other subcells continue to filter, thus minimizing the rate of rise of the liquid level resulting from the pulsing cycle. The passage of liquid through that portion of the bed within the subcell is increased, the through-put of the whole filter cell is increased, and the liquid level rise over the filter bed is minimized. Flow of influent liquid may continue during the pulsing cycle.

After initiation of the first pulsing cycle for a subcell, additional subcell pulsing cycles are initiated sequentially. As the filtration cycle continues, the next subcell activated for a pulsing cycle is chosen in consecutive sequence from all available subcells. The pulsing of individual subcells continues as described above until, either a predetermined number of pulsing cycles initiated at predetermined intervals of time has occurred, or the level of liquid above the filter bed rises to a backwash cycle initiating level, thereby initiating a backwash cycle. Alternatively, a backwash cycle may be initiated after a predetermined filtration time.

As additional solids accumulate on the filter bed during the filtration cycle, the pulsing of subcells becomes less effective in reducing the liquid level above the filter bed. Upon the liquid level rising to said backwash cycle initiating level, greater than the pulse cycle initiating level, influent flow ceases and the whole filter bed cell is backwashed by liquid at an upwardly cleansing velocity.

The pulse cycle initiating and backwash initiating levels above the filter bed are conveniently monitored by individual liquid level sensing means. Additionally, the backwash cycle initiating liquid level sensing means is deactivated during each pulsing cycle to prevent premature backwashing.

To help suspend solids within the influent liquid above the filter bed prior to and during the pulsing cycles and backwash cycle, currents are created in the liquid by supplying fluid, either gas or liquid, to a current creating means such as a conduit with apertures therein, located within the liquid and between the upper surface of the bed and the pulse cycle initiating level.

The pulsing fluid employed in the pulsing cycle may be either air or liquid. The air may be supplied by compressing the air in a plurality of bed support sectors below the filter bed within each subcell by rising filtrate in the filter underdrain cavity. Alternatively, the air may be supplied from a plurality of jet creating means evenly distributed throughout the filter bed within each subcell. Likewise, liquid for the pulsing cycle may be supplied from the plurality of jet creating means. The liquid may be filtrate from the filter.

DESCRIPTION OF THE PREFERRED EMBODIMENTS

Figure 1:
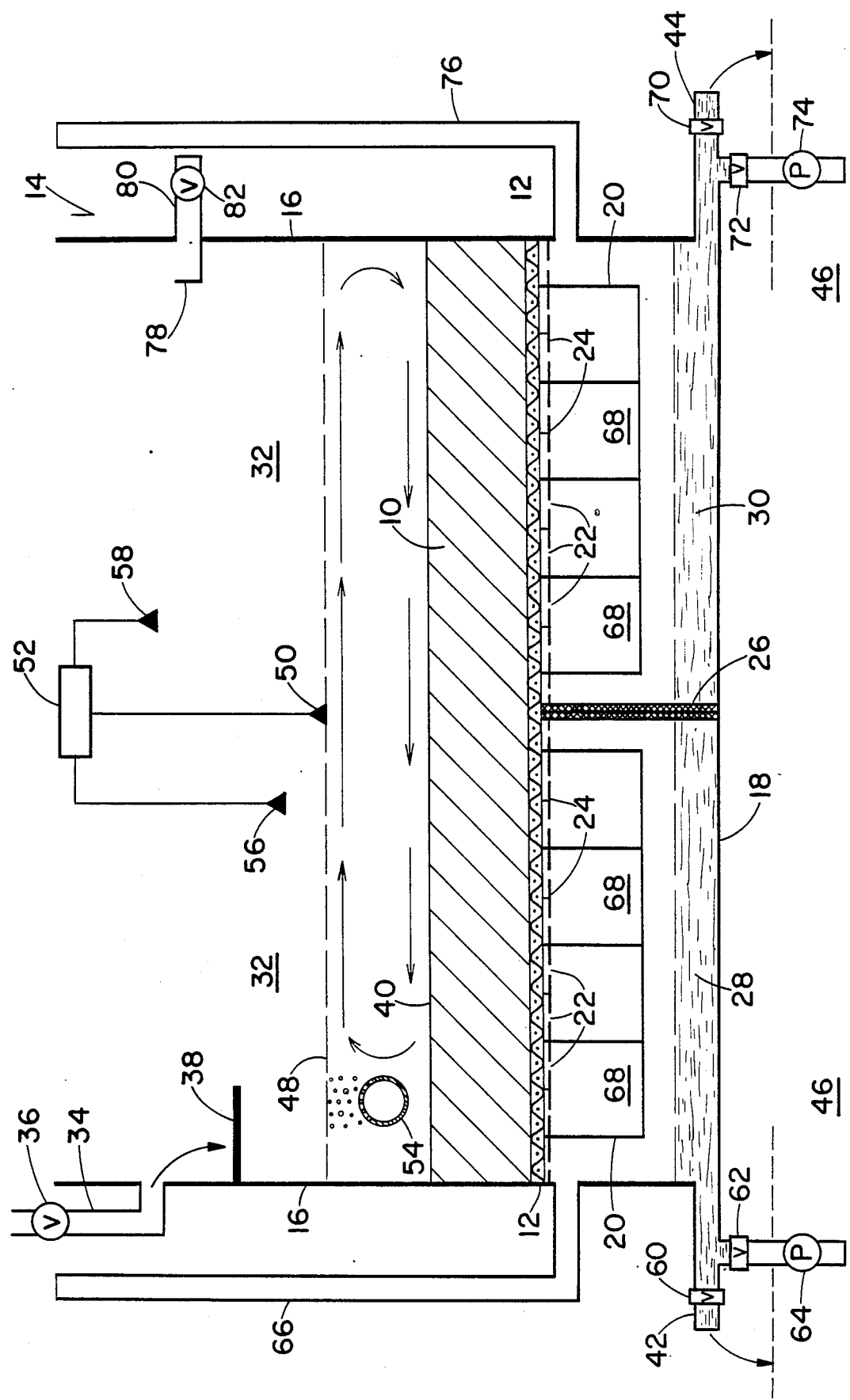
FIG. 1 is a side elevational view showing in somewhat schematic form a granular medium filter cell with two subcells, to which the present invention may be applied.

The method of pulsing a granular medium filter according to this invention is illustrated with reference to the figures. Certain features of a typical filter adapted to practice the invention are shown in partial cross-section in FIGS. 1–5. The filter is merely representative of filters adaptable to pulsing according to the present invention.

A bed 10 of granular medium such as sand is supported on a screen 12 within a filter tank cell 14 having tank walls 16 and a tank bottom 18. An underdrain structure 20 supports the screen 12 and contains an array of orifices 22 in an underdrain plate 24 through which filtrate drains to an underdrain space. A partition 26 divides the underdrain space into, in this case, two underdrain cavities 28 and 30, isolated from fluid communication with each other.

In this embodiment, the same apertures 22 direct a pulsing fluid upwards during the pulsing operations. Other alternative underdrain structure configurations may be used. In an alternative embodiment, the pulsing fluid does not flow through such orifices in the underdrain structure but enters the bed through conduits within the bed itself. In that case, the pulse of fluid passes through the portion of the bed above the orifices, and the lower portion of the bed remains relatively quiescent during the pulsing cycle. This is the preferred method for pulsing with a liquid such as filtrate, although gases may be introduced this way as well.

In FIG. 1, influent liquid to be filtered enters the head space 32 above the filter bed 10 through an inlet 34 controlled by a valve 36. Influent liquid generally is directed to a splash plate 38 or other type of distributor and then to the upper bed surface 40. Solids suspended in the liquid are retained by the filter bed 10 as the filtered liquid passes down through the bed and through the apertures 22 into the underdrain cavities 28 and 30. The filtrate is discharged through conduits 42 and 44 to final disposal or further treatment. A portion of the filtrate is retained in a clearwell 46, where it is stored for backwashing and pulsing the filter bed 10.

The filter tank cell is thus divided into a plurality of subcells, each capable of independent operation. In FIG. 1 there are two subcells, the first comprising the underdrain cavity 28 and the portions of the support structure 20, orifices 22, underdrain plate 24, screen 12 and filter bed medium 10 directly above said cavity 28. The second subcell likewise comprises the underdrain cavity 30 and the portions of the supporting structure, screen and filter bed medium directly above said cavity 30.

Figure 2:
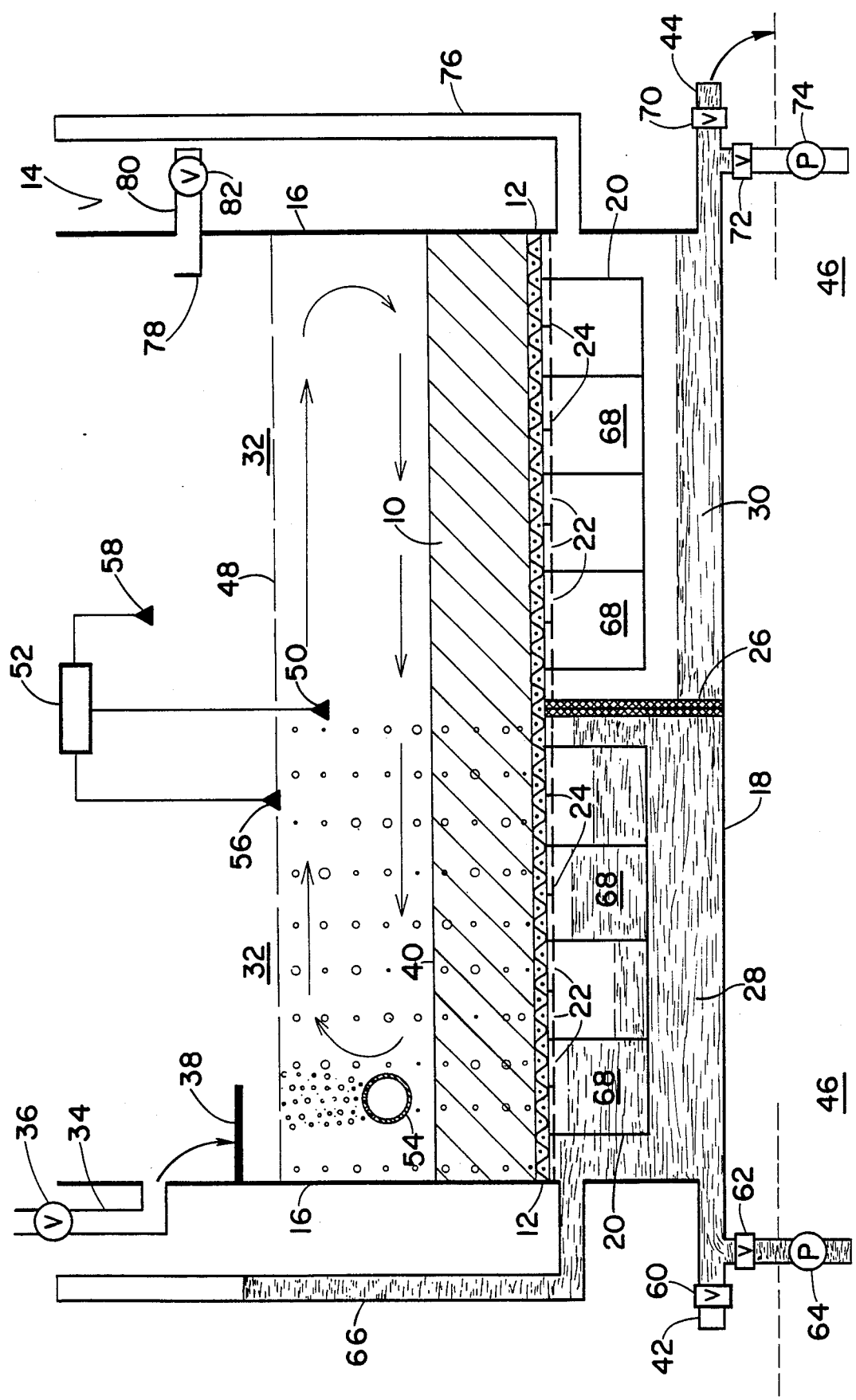
FIG. 2 is a side elevational view of the same granular medium filter showing air pulsing of one subcell of the filter.
Figure 3:
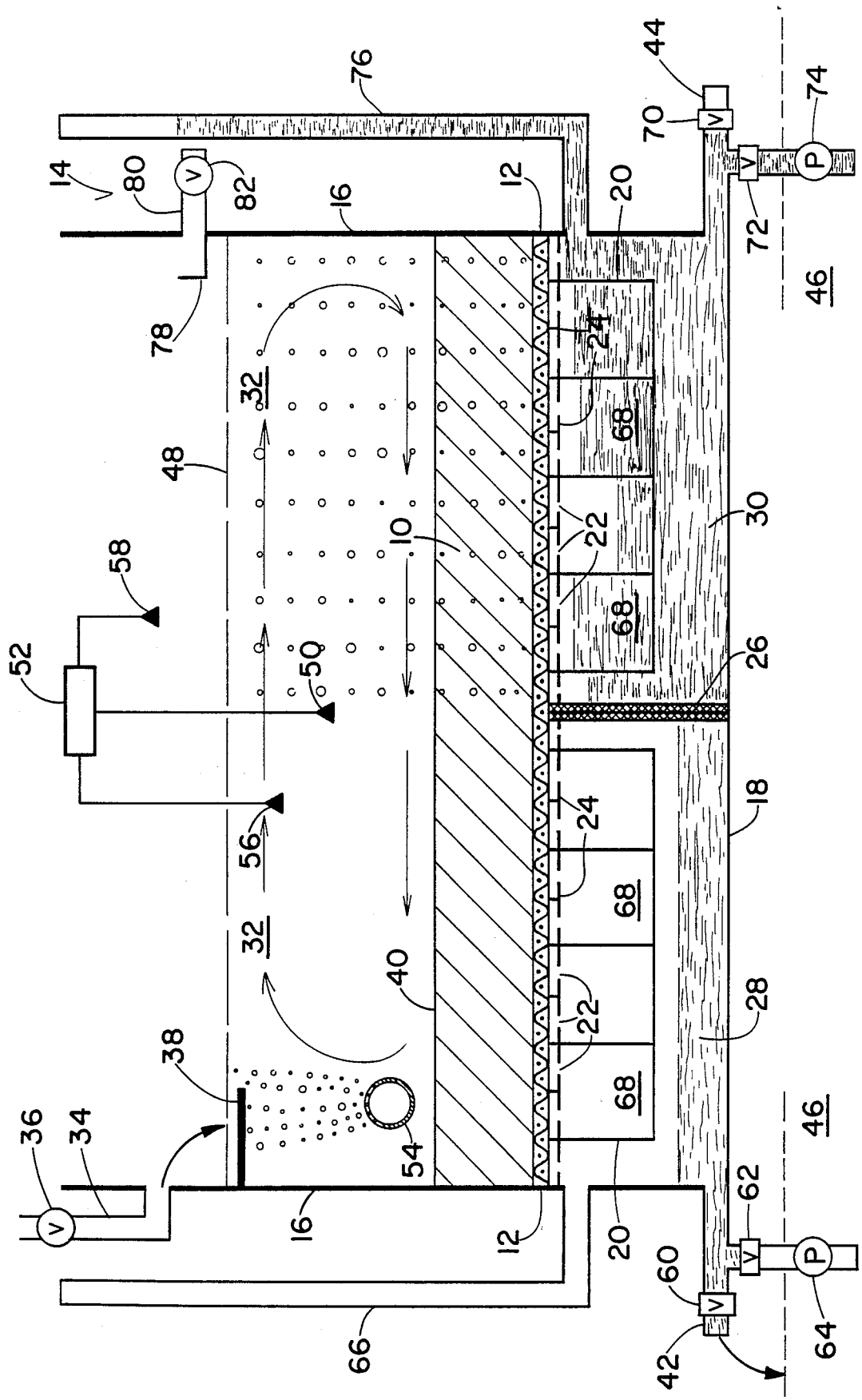
FIG. 3 is a side elevational view of the same granular medium filter showing air pulsing of another subcell of the filter.
Figure 4:
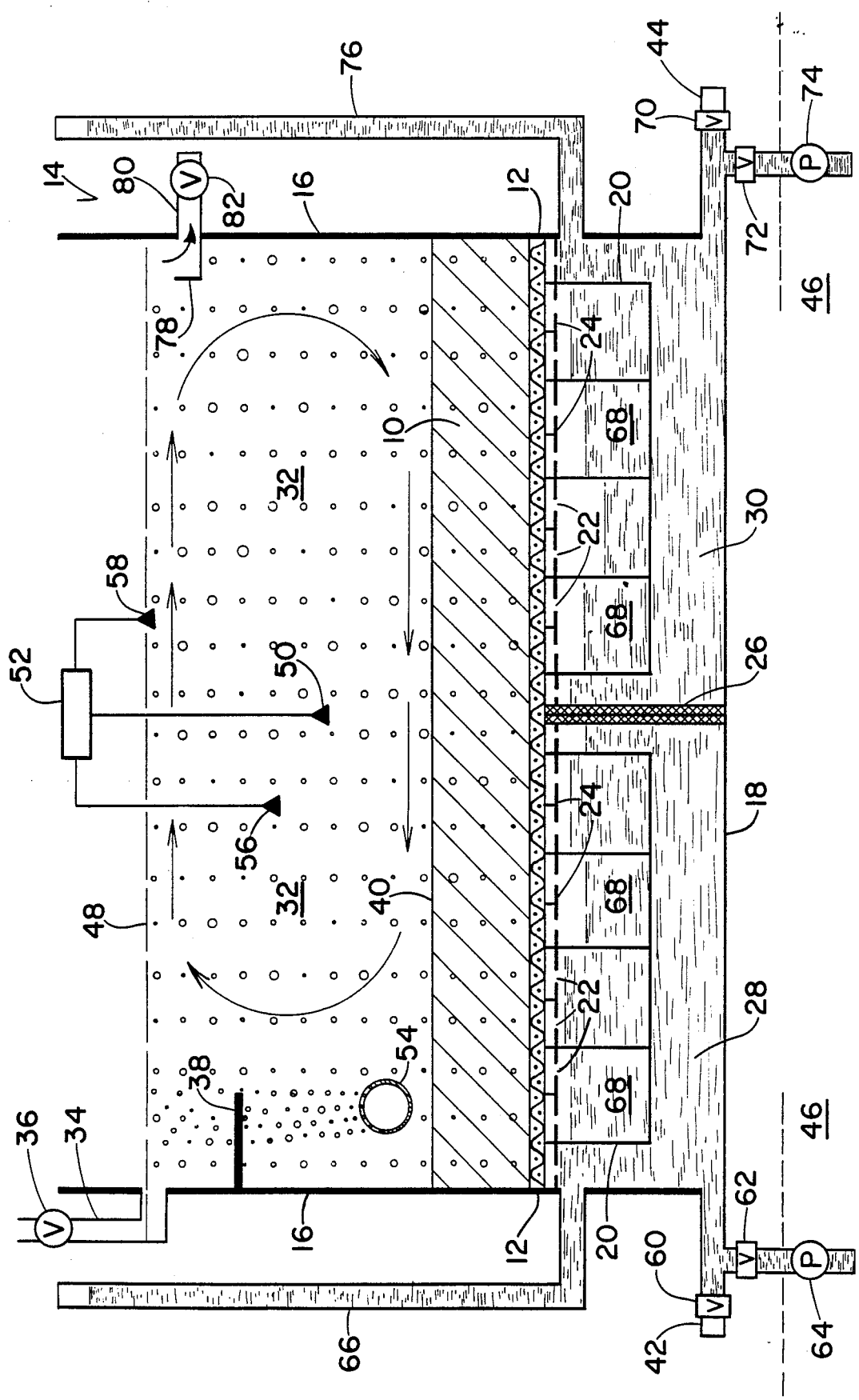
FIG. 4 is a side elevational view of the same granular medium filter showing a portion of the backwash cycle for the filter.
Figure 5:
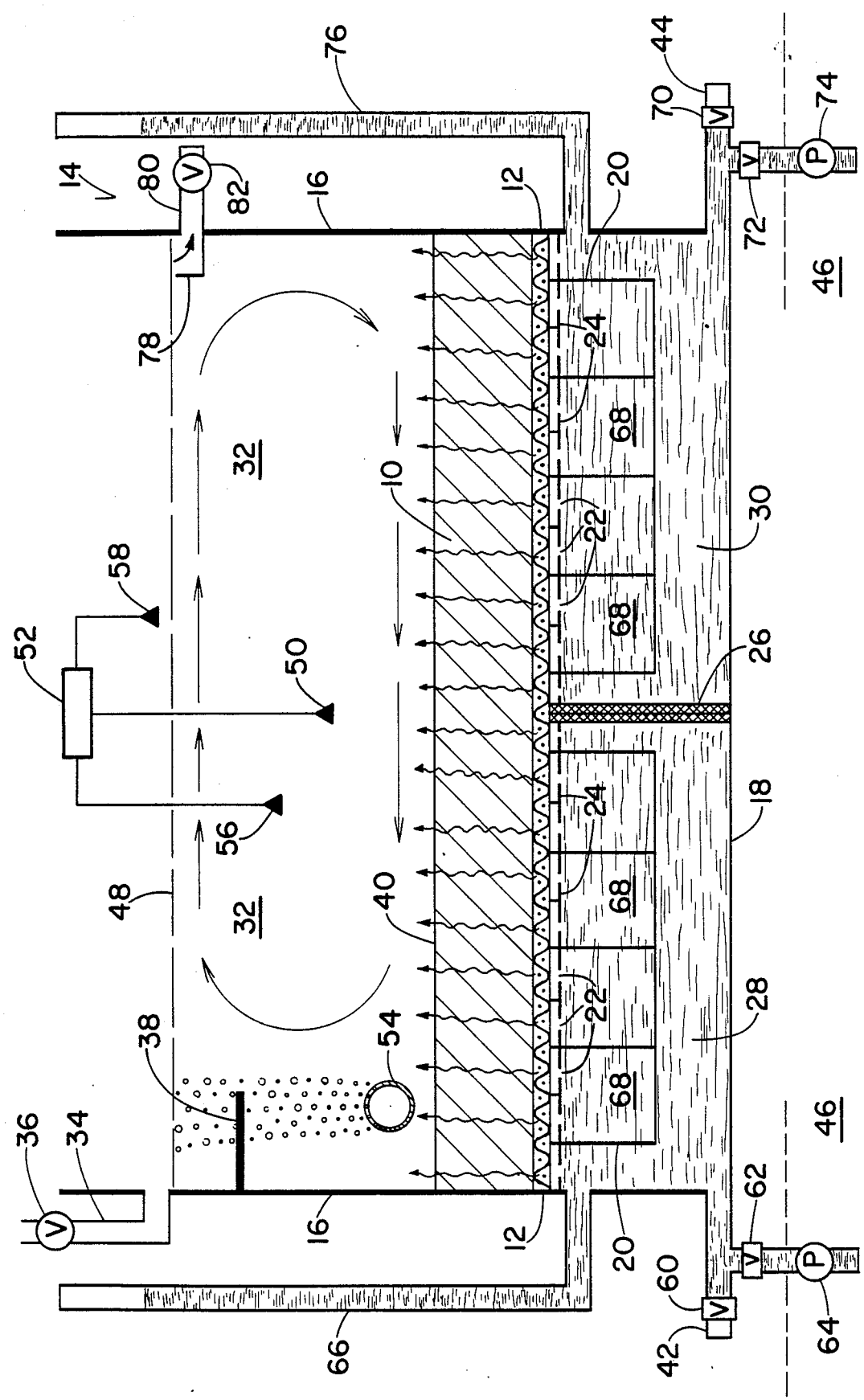
FIG. 5 is a side elevational view of the same granular medium filter showing another portion of the backwash cycle for the filter.

Referring to FIGS. 1 and 2, the pulsing of one of the subcells is described. As solids collect on and within the filter bed medium 10, the liquid level 48 above the bed upper surface 40 rises to a first selected level, activating a first level sensor switch 50 connected to a controller 52 which activates a diffuser 54 extending over the surface 40 for the purpose of creating currents in the wastewater above the bed surface. The diffuser 54, generally a conduit with a number of small holes, creates fine bubbles which cause currents within the wastewater contained in the head space 32 as seen in FIG. 1. The currents sweep over the bed surface 40 to lift and suspend the solid particles collected on the surface during filtration, as well as holding in suspension solid particles removed from the filter medium bed 10 during the pulse cleaning operation described later. This creation of currents in the liquid above the filter bed is termed the "air scour" method for removing particulate material collected on the filter bed surface 40.

As wastewater continues to enter the filter cell, the liquid level 48 rises to a second selected level activating a second level sensor switch 56 which initiates a pulsing cycle for the first subcell containing underdrain cavity 28. A third level sensor switch 58, which initiates the backwash cycle, is deactivated during each pulsing cycle to prevent premature backwash.

The pulsing cycle for the subcell containing underdrain cavity 28 occurs as shown in FIG. 2. Effluent discharge from the conduit 42 ceases by closing a valve 60 and opening a valve 62 allowing a pump 64 to transfer filtrate from the clearwell 46 into the underdrain cavity 28. As the cavity fills, excess air in the underdrain cavity 28 is expelled through a vent conduit 66. When the liquid level in underdrain cavity 28 reaches the lower edges of the underdrain structure 20, and rises in each of the underdrain support sectors 68, it forces air trapped in these spaces 68 through the orifices 22 within the first subcell and upward through that portion of the filter bed 10 thereabove. The passage of air up through the filter bed increases the porosity of the bed and causes some of the solids retained on the surface to be folded into the bed proper, further increasing bed porosity. The pulsing cycle is continued until the filtrate pumped by the pump 64 approaches the orifices 22.

Following a pulsing cycle the pump 64 is shut off, valve 62 closes and valve 60 is opened, allowing the underdrain cavity 28 to drain. The pulsing cycle increases the porosity of the subcell filter bed and flow of liquid therethrough is increased. Filtration continues during a pulsing cycle for the portion of the cell not within the first subcell. The pulsing cycle functions to decrease the liquid level above the filter medium bed 10. Backwash level sensor 58 is reactivated following each pulsing cycle. After initiation of the first pulsing cycle for a subcell, the controller 52 activates additional subcell pulsing cycles at predetermined intervals of time. The pulsing of individual subcells continues until either a predetermined number of pulsing cycles has occurred or the liquid level 48 above the filter bed surface 40 rises to a third predetermined level, initiating a backwash cycle by activating the level sensor 58. Alternatively, a backwash cycle may be initiated after a predetermined filtration time. The predetermined maximum number of pulsing cycles performed before backwash may be fixed or vary according to influent flow. Commonly, backwash occurs after completion of two or more of said pulsing cycles.

Continuing with the filtration run, following the predetermined time interval from the first pulsing cycle for the first subcell, the controller 52 commences a pulsing cycle for a second subcell comprising the underdrain cavity 30 and the portions of the filter thereabove. The pulsing cycle for the second subcell is as described for the first subcell and shown in FIG. 3. The diffuser 54 continues to provide currents in the wastewater above the filter bed 10 which assists in suspending solid particles collected on the filter bed surface 40 and those solids removed from the filter bed during the pulse cleaning sequence.

At some point in the filter run solids accumulate on and in the filter bed to the extent that the pulsing of subcells becomes less and less effective in reducing the liquid level above the filter bed. In this instance as the liquid level 48 rises to a third selected level, it activates the level switch 58 which initiates a backwash cycle for all subcells within the filter cell. Influent flow to the filter cell ceases by closing the influent control valve 36. The valves 60 and, 70 close, the valves 62 and 72 open and the pumps 64 and 74 deliver filtrate to both the underdrain cavities 28 and 30 forcing air (FIG. 4) and finally filtrate up through the filter bed medium 10 (FIG. 5) at a cleansing velocity. Each subcell underdrain is individually vented to the atmosphere, a conduit 76 servicing the underdrain cavity 30. The backwash flow of filtrate continues and the filtrate washes the solids stored in and on the bed from the filter medium bed, carrying the solids over a backwash weir 78 and out from the filter cell via a conduit 80 to disposal. The control valve 82 in conduit 80 is open only during the backwash cycle. The diffuser 54 continues to provide currents in the liquid above the filter bed during the backwash cycle which assists in carrying solids over the backwash weir 78 and out of the filter cell.

Although separate pumps 64 and 74 are shown for each subcell, a single pump servicing all subcell underdrains through appropriate valves and piping would provide equivalent performance on the process of this invention.

The space 32 between the filter bed surface 40 and backwash cycle activation level sensor 58, in FIGS. 1-5, is termed the liquid head space for granular medium filters. The head space can be thought of as the holding volume where influent wastewater awaits passage through the filter bed medium. This head space is fixed by the design for a particular filter cell. The instant invention allows the filter cell to minimize loss of head due to pulsing, even with high influent flows.

Figure 6:
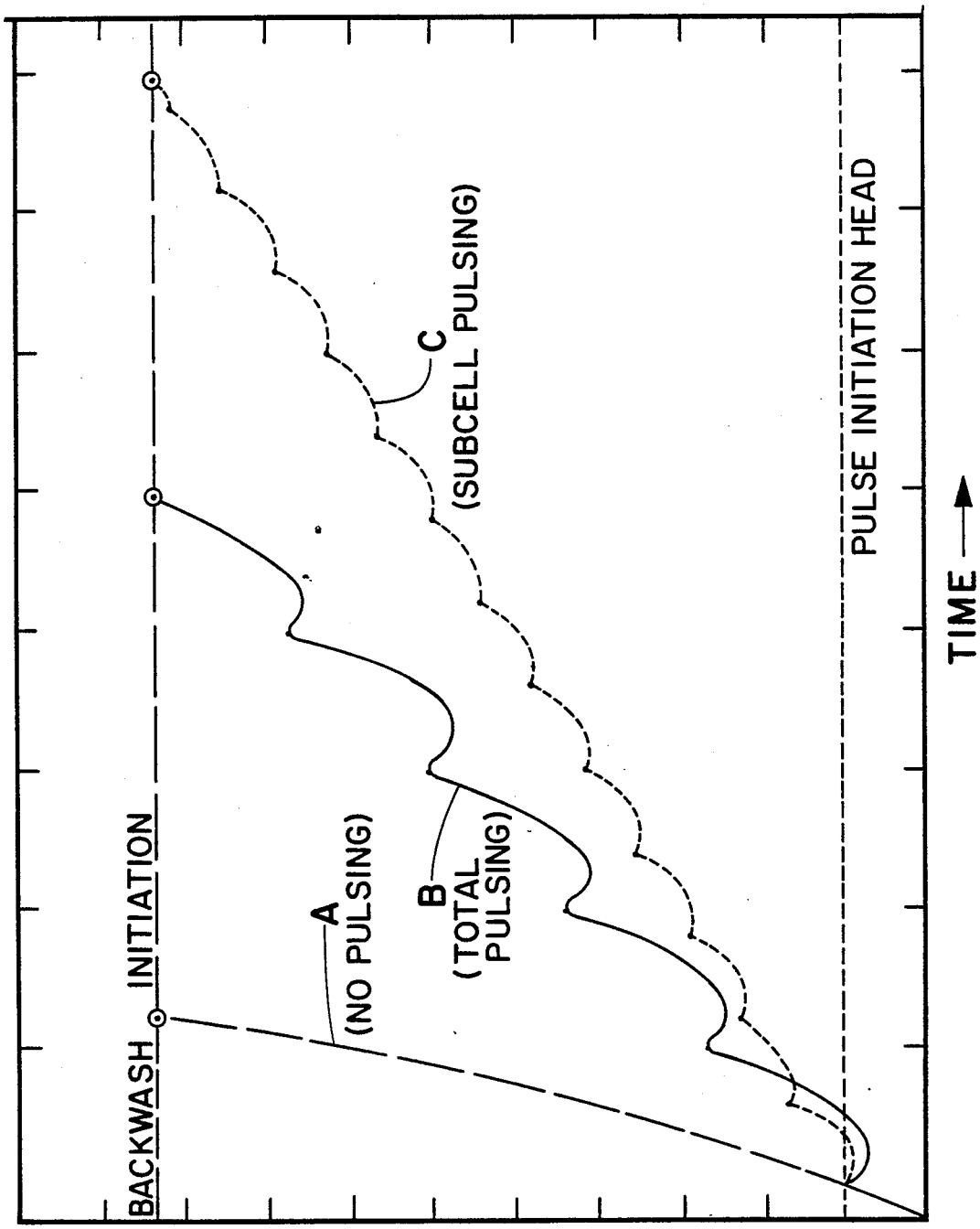
FIG. 6 is a graphical depiction of the rate of head level rise for three modes of operation of a granular medium filter.

The liquid level in the head space gradually rises during a filtration run, due to solids collection in and on the filter bed which reduces the bed porosity, and finally activates a backwash cycle upon reaching the level sensor 58. The observed rise of liquid level in the liquid head space is the difference between influent application rate and the filtration rate over a period of time, i.e. liquid passing through the filter bed 10 to the underdrain space. A plot of liquid head level versus time for various filtering methods is shown in FIG. 6 to help illustrate the advantages of the instant invention.

Considering an even application rate with a constant solids loading rate for all situations, curve A represents liquid head level above the filter bed versus time with no "air scour" or "air pulse" cycle for the filter cell of FIGS. 1-5. As solids collect in and on the filter bed, filter porosity decreases and the liquid head level quickly rises to the backwash initiation level, producing a backwash cycle. The resulting high frequency of backwash cycles from this method produces a large hydraulic volume of backwash water with limited solids capture capability for the filter.

Curve B shows the liquid head level of the filter cell with the "air pulse" operated through out the whole filter cell bed. Each time the air pulsing cycle operates, the liquid head level continues to rise at the application rate, as all flow through the bed ceases and air is forced up through the bed to fold over the surface solids and increase bed porosity. After the pulsing cycle, the liquid head level first falls due to increased bed porosity and then rises as the filtration cycle continues and additional solids are captured. These pulsing cycles are continued until the liquid head level reaches the backwash level, initiating the backwash cycle. Thus, the duration of the filtration run with total filter cell pulsing is extended compared to the filtering method of curve A, that is without pulsing. The total cell area pulsing delays the liquid rise above the filter bed from reaching the backwash initiation level of the filter cell. The volume of backwash water is reduced compared to the volume resulting from curve A with a lower hydraulic load returned to the treatment plant.

Curve C shows the liquid head level of the filter cell with "air pulse" operated in the method of the instant invention, as depicted in FIGS. 1-5. The pulsing of only a portion, i.e. a subcell, of the filter cell bed interrupts flow only through that subcell while the remainder of the filter cell bed continues in operation with liquid passing therethrough, thus reducing the instant liquid head level rise associated with the application rate and pulse. The pulsing of the subcells stores solids in the bed and increases the porosity of the bed in that subcell, enabling more liquid to pass through that subcell.

The subsequent air pulsing cycle is then performed on another subcell, again while the remainder of the filter cell bed continues in the filtering operation, again reducing the liquid head level rise associated with the overall application rate.

The process of the invention results in a lower rate of rise of the liquid head level in the cell, reflected in a lower slope for curve C compared to curve B. This process delays the backwash cycle, allowing additional solids capture by the filter bed, with a much higher application rate, and ultimately reduces the backwash hydraulic volume recycled to the treatment process compared to the process of curve B.

Another embodiment of the process of the invention is described employing FIGS. 7-10. Components of FIGS. 7-10 common with those of FIGS. 1-5 are identified by the same numbers.

Figure 7:
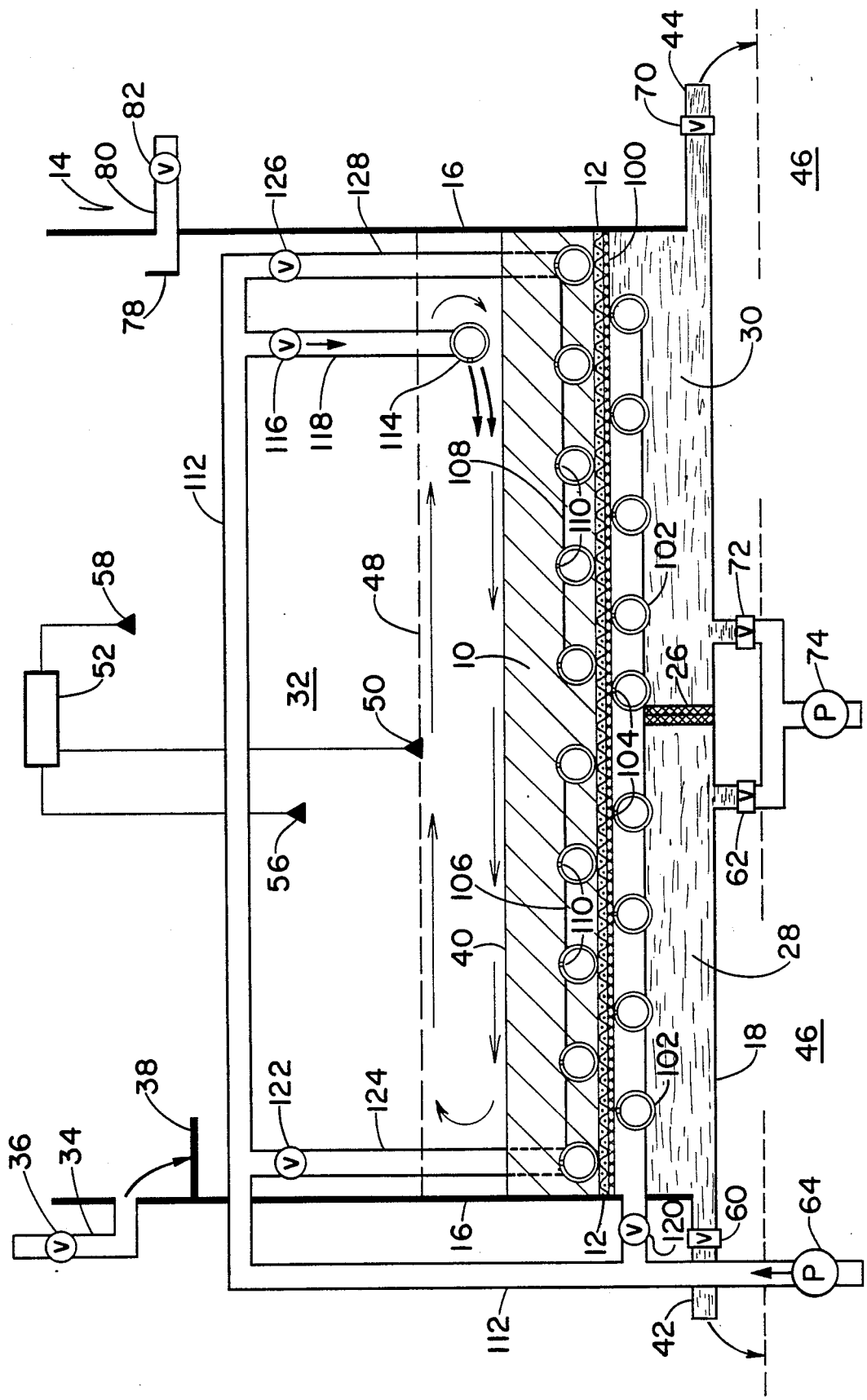
FIG. 7 is a side elevational view of another type of granular medium filter cell to which the present invention may be applied, with jet scouring of the cell.

Referring now to FIG. 7, another filter representative of filters adaptable to pulsing according to the present invention, a bed 10 of granular medium such as sand is supported on a screen 12 within a filter tank cell 14 having tank walls 16 and a tank bottom 18. The screen and medium bed are supported by a screen support structure 100. Beneath and closely adjacent to the support structure 100, in an underdrain space, is an array of conduits 102 with an evenly spaced jet creating means 104 therein, adapted to supplying a flow of liquid for backwashing said medium bed 10. A partition 26 divides the underdrain space into, in this case, two underdrain cavities 28 and 30, isolated from fluid communication with each other.

In operation, liquid to be filtered enters the head space 32 above the filter bed 10 through an inlet 34 controlled by a valve 36. Influent liquid generally is directed to a splash plate 38 or other type of distributor and then to upper bed surface 40. Solids suspended in the liquid are retained by the filter bed 10 and the filtered liquid passes through the screen 12 and the support structure 100 into the underdrain cavities 28 and 30. The filtrate is discharged through the conduits 42 and 44 to final disposal or further treatment. A portion of the filtrate is retained in a clearwell 46, where it is stored for backwashing and pulsing the filter bed 10.

Above the support screen 12 and contained within the filter bed 10 there is another array of conduits adapted for pulsing of the upper portion of the filter bed 10 with a fluid. The upper conduit array is staggered in position relative to the lower conduit array 102 as shown in FIGS. 7-10. The upper conduit array is divided into a plurality, in this case two, of separately controlled subarrays 106 and 108, the upper conduit array containing upwardly directing jet creating means 110 to provide pulses of liquid to the medium bed 10. The conduit subarray 106 and the portion of the filter bed 10 thereabove define a subcell of the filter cell 14 and the conduit subarray 108 and the portion of the filter bed 10 thereabove define another subcell of the filter cell 14. Backwashing and pulsing fluid is supplied to the conduit arrays from the clearwell 46 by a pump 64 and a conduit 112 with the appropriate control valves.

Figure 8:
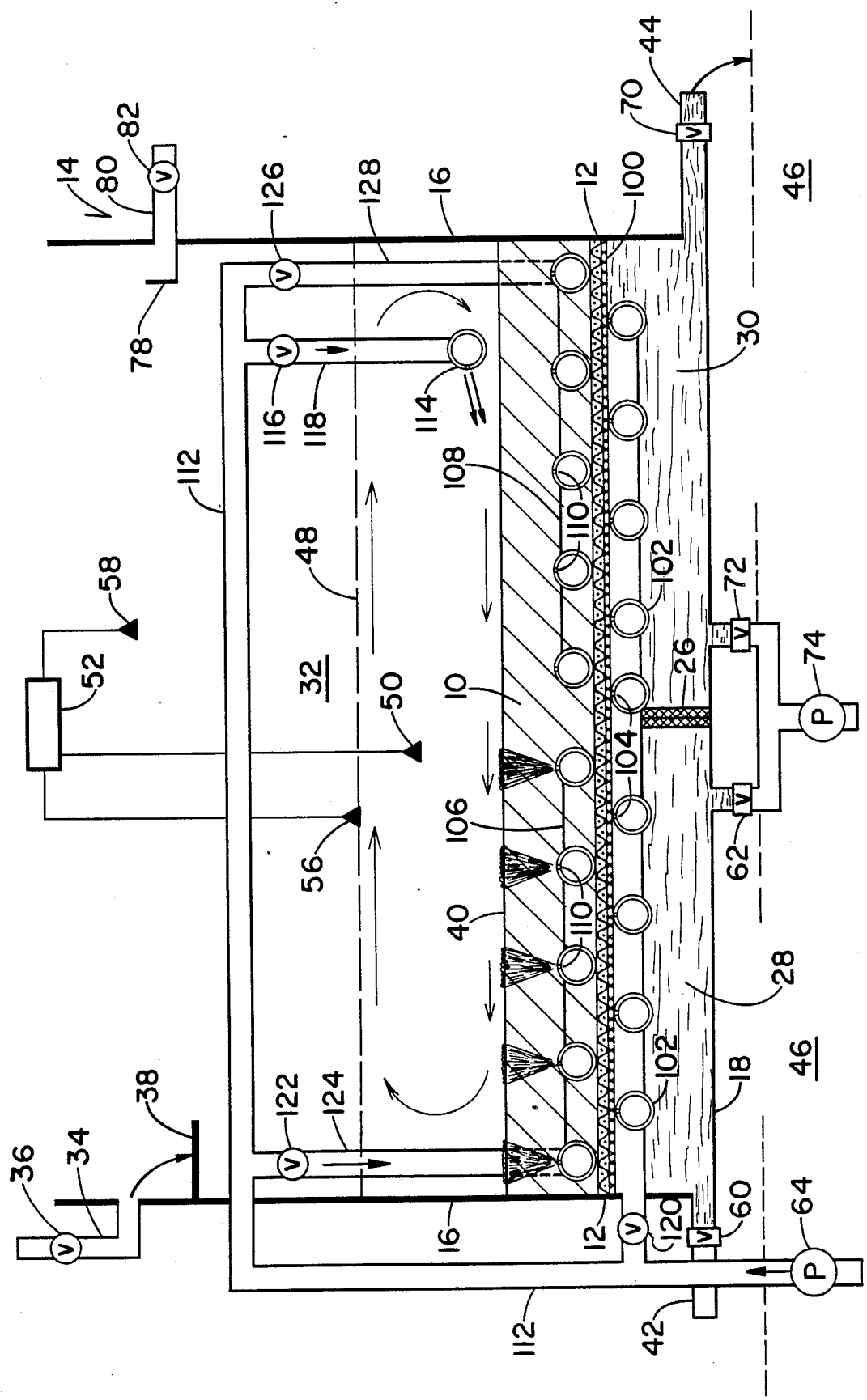
FIG. 8 is a side elevational view of the same granular medium filter with fluid pulsing of one of the subcells.
Figure 9:
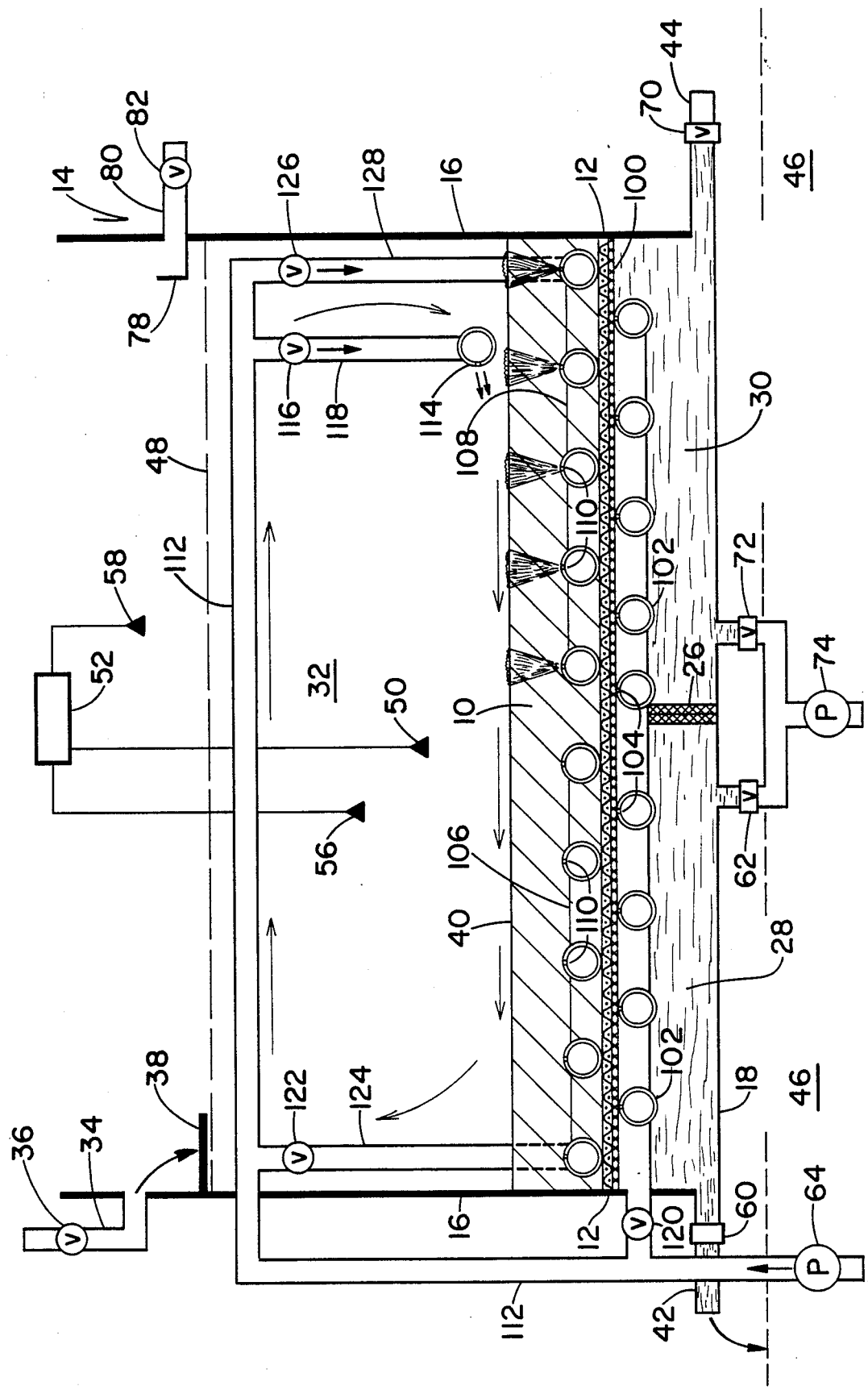
FIG. 9 is a side elevational view of the same granular medium filter with fluid pulsing of another of the subcells.

Referring now to FIGS. 7 and 8, the pulsing of one of the subcells is described. As solids collect within and on the filter bed medium 10, the liquid level 48 above the bed upper surface 40 rises to a first selected level activating a first level sensor switch 50 connected to a controller 52 which activates a hydraulic jet creating means 114 extending over the surface 40 for the purpose of creating currents in the wastewater above the bed surface. The pump 64 delivers filtrate from the clearwell 46 via the conduit 112 through a valve 116 and another conduit 118 to jet creating means 114. The hydraulic jet crating means 114, generally a conduit with a number of small holes located along one side thereof, creates hydraulic jets which cause currents within the wastewater contained in the head space 32 as seen in FIG. 7. The currents sweep over the bed surface 40 to lift and suspend the solid particles collected on the surface during filtration, as well as holding in suspension solid particles removed from the filter medium bed 10 during the pulse cleaning operation described later. This creation of currents in the liquid above the filter bed is termed the "jet scour" method for lifting and holding in suspension the particulate material collected on the filter bed surface 40.

Referring to FIG. 8, as wastewater continues to enter the filter cell, the liquid level 48 rises to a second selected level activating a second level sensor switch 56, which initiates a pulsing sequence for the first subcell containing the pulsing conduit subarray 106. A third level sensor switch 58, which initiates the backwash cycle, is deactivated during the pulsing cycle to prevent premature backwash.

The pulsing cycle for the subcell containing the pulsing conduit subarray 106 occurs as follows. The control valve 60 in the outlet conduit 42 closes stopping the flow of filtrate from the underdrain cavity 28. The pump 64 remains activated while a valve 120 to the backwash conduit array 102 remains closed. A valve 122 is opened supplying filtrate to the pulsing conduit subarray 106 via conduits 112 and 124. The filtrate is directed upwardly from jet creating means 110 in the conduit subarray 106 at a velocity sufficient to remove solids from the bed surface 40 and to fold a portion of the solids into the bed. Following a pulsing cycle, the valve 122 closes and the backwash sensor 58 is reactivated. The control valve 60 opens, again allowing filtrate to flow from the underdrain cavity 28. The pump 64 and the hydraulic jet creating means 114 continues in operation.

Filtration continues during a pulsing cycle for the portion of the cell not within the first subcell. The pulsing cycle functions to decrease the liquid level above the filter medium bed 10. After initiation of the first pulsing cycle for a subcell, each following subcell pulsing cycle is initiated after a predetermined interval of time. Again, the pulsing cycles are continued until either a predetermined number has occurred, the level of liquid above the filter bed rises to activate the backwash sensor, or until a predetermined filtration time has elapsed.

As the filtration run continues, the controller 52 commences a pulsing cycle for a second subcell comprising the conduit subarray 108 and the portions of the filter thereabove. The pulsing sequence for the second subcell is as described for the first subcell and shown in FIG. 9. In this case the control valve 70 closes, stopping filtrate flow from the underdrain cavity 30. The valve 122 is closed and a valve 126 is open, supplying fluid through a conduit 128 to the conduit subarray 108 with jet creating means 110 providing upwardly directed pulses to that portion of filter bed 10 within the second subcell. The valve 116 remains open and the current creating means 114 continues to provide currents in the wastewater above the filter bed 10 which assists in suspending solid particles removed from the filter bed during the pulse cleaning sequence. After the pulsing cycle the control valve 70 opens, again allowing filtrate to flow from the underdrain cavity 30.

Figure 10:
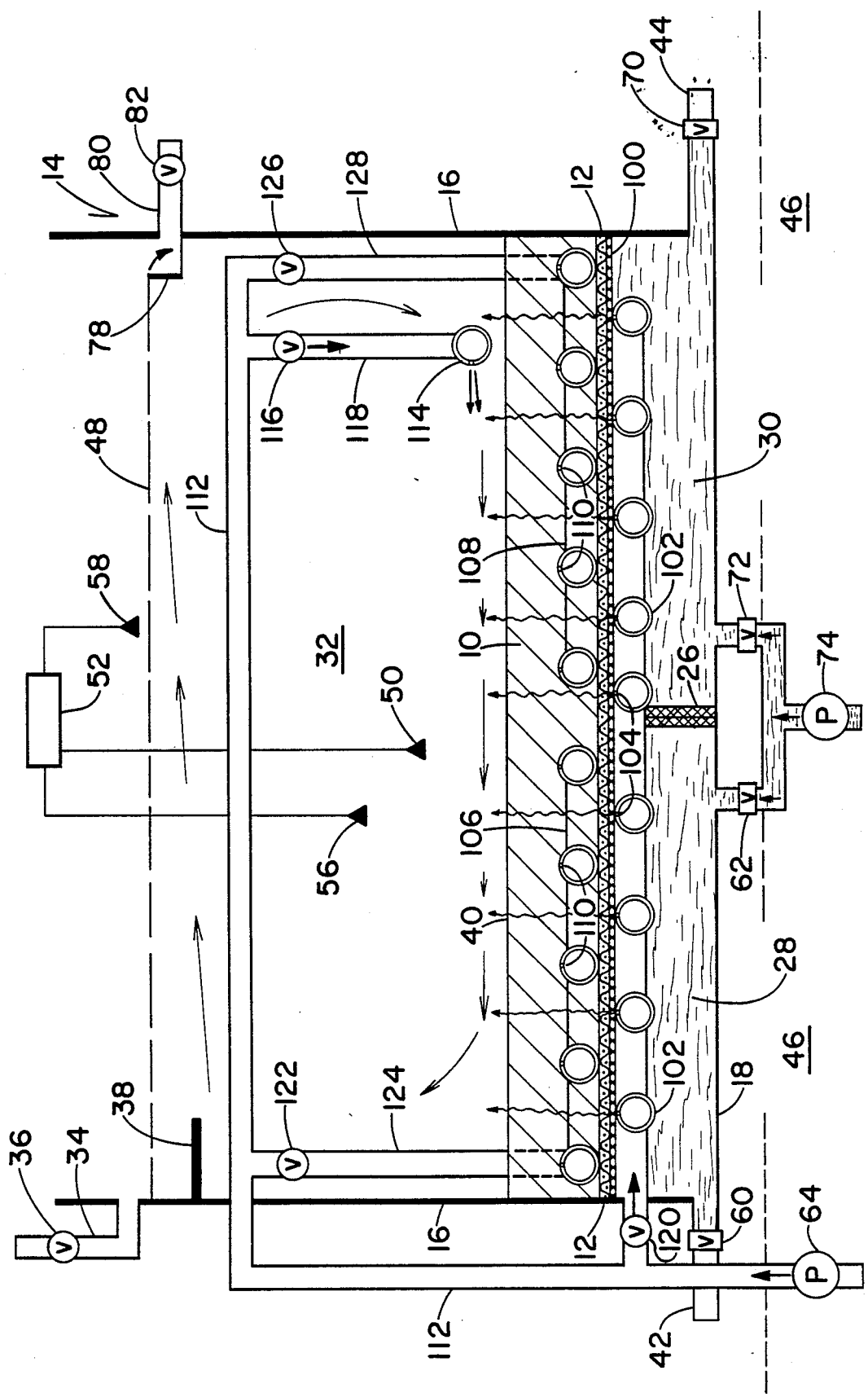
FIG. 10 is a side elevational view of the same granular medium filter showing a portion of the backwash cycle.

At some point in the filter run solids accumulate on and in the filter bed to the extent that the pulsing of subcells becomes less and less effective in reducing the liquid level above the filter bed. In this instance as the liquid level 48 rises to a third selected level, it activates the level switch 58 which initiates a backwash cycle for all subcells within the filter cell. Referring to FIG. 10, influent flow to the filter cell ceases by closing the influent control valve 36 and the outlet valves 60 and 70. The valves 62 and 72 open and a pump 74 is activated, delivering backwash liquid from the clearwell 46 to the underdrain cavities 28 and 30. The liquid flows upwardly through the screen support structure 100, the screen 12 and the filter bed medium 10 at a cleansing velocity to remove solids from the filter bed. The solids and backwash liquid are carried over an outlet weir 78 and out of the filter cell via a conduit 80 fitted with a control valve 82. Concurrently, the valve 120 opens to deliver filtrate to the conduit array 102 with jet creating means 104 directing filtrate onto and through the support 100 and screen 12 to assist in removing solids therefrom. The pulsing control valves 122 and 126 are ordinarily closed during the backwash cycle although these valves may be opened to assist in the backwashing of the filter bed. Valve 116 remains open and jet creating means 114 continues operation to assist in flushing the solids from the cell over the outlet weir 78. After a specified period of time the backwash cycle is completed. The pumps 64 and 74 then stop, the valves 116 and 120 close and the valves 60 and 70 open, commencing another filtration cycle.

Although separate pumps 64 and 74 are shown for pumping filtrate to the conduit arrays and underdrain cavity respectively, a single pump for delivering filtrate to all of these areas would provide equivalent performance in the process of this invention.

Although the two embodiments of the invention are described for two subcells within a filter cell, three, four or more subcells may be employed within a filter cell to perform the process of this invention.

EXAMPLE

A filter cell, designed for operation with air mix and air pulse cycles, and roughly 7×10 ft. providing 69.55 ft$^2$ filter bed surface, was equipped to individually pulse each half of the cell bed. The influent application rate ranged from 10 gpm/ft$^2$ to as high as 13.2 gpm/ft$^2$ during the test run. The controller for the filter cell was set for a maximum of 30 pulsing cycles before backwash. The pulsing cycle duration for each half cell was 13 seconds and the time between pulsing cycles was 130 seconds. The duration of the backwash cycle was 3 minutes. The backwash sensor was deactivated during each pulsing cycle to prevent premature backwash of the cell.

The first filtration cycle of the test was conducted with an application rate of 10.3 gpm/ft$^2$. After the 30 pulsing cycles were exhausted, the liquid head level quickly rose to activate the backwash sensor. The first filtration cycle lasted 87 minutes. The backwash rate for this cycle was only 3.93% of influent volume. The liquid head level curve during the pulsing cycles had a slope of only 15 degrees, as determined from a strip chart recorder. Once the pulsing cycles had expired, the liquid head level curve slope jumped to 75 degrees and the backwash sensor was activated. About one third of the total head volume for the filter cell was not utilized in this filtration cycle before all the pulsing cycles were used.

Second and third filtration cycles were then conducted with an application rate of 12.78 gpm/ft$^2$. The combined cycles lasted 110 minutes with a filter cell backwash ending each cycle prior to the maximum 30 pulsing cycles. The backwash rate was only 5.03% of influent volume for these combined filtration cycles.

A fourth filtration cycle was then conducted, with an application rate of 13.2 gpm/ft$^2$, which lasted 71 minutes. Backwash ended the filtration cycle prior to the maximum 30 pulsing cycles. The backwash rate was only 3.75% of influent volume.

Excellent filtrate containing about 10 mg/l suspended solids was produced during each of these high application rate filtration run tests.

I claim:

1. A method for removing solids from an influent liquid during periods of high volumetric influent flow during a filtration time in a filtration cycle, by passage of said liquid through a down-flow granular medium filter bed in a filter tank cell, said filter bed having an upper surface and a lower surface, and made up of a plurality of subcells, each subcell individually adapted and controlled for periodic upwardly directed pulses of fluid from an array of orifices therein at times other than during backwashing, comprising the steps:
   (a) continuously introducing said influent liquid into said filter tank cell for downward solids-removing passage through said filter bed;
   (b) allowing liquid in said filter tank cell to rise to a pulse cycle initiating level above said upper surface of said filter bed during the filtration time;
   (c) activating a first selected subcell of said filter cell for a pulsing cycle upon the level of liquid above the filter bed exceeding said pulse cycle initiating level, said pulsing cycle comprising intermittent upwardly-directed multiple pulses of a fluid through that portion of the filter bed within said selected subcell from said array of orifices therein, to dislodge solids from said upper surface of said bed within said subcell, store filtered solids within that portion of the filter bed, and increase the passage of liquid through that portion of the bed within said subcell, thereby minimizing the liquid level rise above said upper surface of said filter bed;
   (d) activating a second selected subcell of said filter cell for a pulsing cycle, said pulsing cycle comprising intermittent upwardly-directed multiple pulses of a fluid through that portion of the filter bed within said selected subcell from said array of orifices therein, to dislodge solids from said upper surface of said bed within said subcell, store filtered solids within that portion of the filter bed, and increase the passage of liquid through that portion of the bed within said subcell, thereby minimizing the liquid level rise above said upper surface of said filter bed;
   (e) allowing liquid in said filter tank cell to rise to a backwash cycle initiating level, greater than said pulse cycle initiating level, during the filtration time;
   (f) ceasing the introduction of influent liquid into said filter tank cell; and
   (g) backwashing said filter bed at an upwardly cleansing velocity after completion of two or more said pulsing cycles.

2. A process according to claim 1 wherein a specified period of time elapses between pulsing cycle step (c) and pulsing cycle step (d).

3. A process according to claim 1 wherein each subcell activated for a pulsing cycle is selected in predetermined consecutive sequence from all available subcells.

4. A process according to claim 1 wherein a predetermined maximum number of said pulsing cycles is performed prior to said rising of liquid to said backwash cycle initiating level in step (e).

5. A process according to claim 1 wherein said ceasing of influent step (f) and said backwashing step (g) occur after a predetermined filtration time has elapsed, without said rising of liquid to said backwash cycle initiating level in step (e).

6. A process according to claim 1 wherein individual liquid level sensing means are used to sense the pulse cycle initiating level and the backwash cycle initiating level above said filter bed.

7. A process according to claim 6 wherein said backwash cycle initiating liquid level sensing means is deactivated during said pulsing cycle thereby preventing premature backwashing of said filter bed cell.

8. A process according to claim 1 further comprising the step of creating currents within said influent liquid above said filter bed by current creating means located above said filter bed and below said pulse cycle initiating level, to suspend filtered solids within said influent liquid above said filter bed.

9. A process according to claim 8 wherein said current creating means is conduit which delivers a gas to apertures therein, thereby causing said currents.

10. A process according to claim 8 wherein said current creating means is conduit which delivers liquid to apertures therein, thereby causing said currents.

11. A process according to claim 10 wherein said liquid is filtrate from said granular medium filter bed.

12. A process according to claim 1 wherein said pulsing fluid, directed through that portion of the filter bed within the subcell, is air.

13. A process according to claim 12 wherein said pulsing fluid is air motivated upwardly through that portion of the filter bed within the subcell, each pulse produced by a rising liquid level in each of a plurality of bed support sectors below said filter bed within the subcell, said rising liquid trapping and forcing air upwardly in each individual sector.

14. A process according to claim 1 wherein said pulsing fluid is directed upwardly through only an upper portion of said filter bed within said subcell.

15. A process according to claim 14 wherein said pulsing fluid is air directed upwardly by a plurality of jet creating means evenly distributed throughout said filter bed within said subcell.

16. A process according to claim 14 wherein said pulsing fluid is liquid directed upwardly by a plurality of jet creating means evenly distributed throughout said filter bed within said subcell.

17. A process according to claim 16 wherein said pulsing fluid is filtrate from said granular medium filter bed cell.

18. A method for removing solids from an influent liquid during periods of high volumetric influent flow during a filtration time in a filtration cycle, by passage of said liquid through a down-flow granular medium filter bed in a filter tank cell, said filter bed having an upper surface and a lower surface, and made up of a plurality of subcells, each subcell individually adapted and controlled for periodic upwardly directed pulses of fluid from an array of orifices therein at times other than during backwashing, comprising the steps:

(a) continuously introducing said influent liquid into said filter tank cell for downward solids-removing passage through said filter bed;

(b) allowing liquid in said filter tank cell to rise to a selected first level above said upper surface of said filter bed during the filtration time;

(c) creating currents within said influent liquid above said filter bed by current creating means located above said filter bed and below said selected first level, to suspend filtered solids within said influent liquid above said filter bed;

(d) allowing liquid in said filter tank cell to rise to a selected second level, greater than said selected first level, above said upper surface of said filter bed during the filtration time;

(e) activating a first selected subcell of said filter cell for a pulsing cycle upon the level of liquid above the filter bed exceeding said selected second level, said pulsing cycle comprising intermittent upwardly-directed multiple pulses of a fluid through that portion of the filter bed within said selected subcell from said array of orifices therein, to dislodge solids from said upper surface of said bed within said subcell, store filtered solids within that portion of the filter bed, and increase the passage of liquid through that portion of the bed within said subcell, thereby minimizing the liquid level rise above said upper surface of said filter bed;

(f) activating a second selected subcell of said filter cell for a pulsing cycle, said pulsing cycle comprising intermittent upwardly-directed multiple pulses of a fluid through that portion of the filter bed within said selected subcell from said array of orifices therein, to dislodge solids from said upper surface of said bed within said subcell, store filtered solids within that portion of the filter bed, and increase the passage of liquid through that portion of the bed within said subcell, thereby minimizing the liquid level rise above said upper surface of said filter bed;

(g) allowing liquid in said filter tank cell to rise to a selected third level, greater than said selected second level, during the filtration time;

(h) ceasing the introduction of influent liquid into said filter tank cell; and (i) backwashing said filter bed at an upwardly cleansing velocity after completion of two or more said pulsing cycles.

19. A process according to claim 18 wherein first liquid level sensing means is used to sense the selected first level, second liquid level sensing means is used to sense the selected second level and third liquid level sensing means is used to sense the selected third level above said filter bed.

20. A process according to claim 19 wherein said third liquid level sensing means is deactivated during said pulsing cycle thereby preventing premature backwashing of said filter bed cell.

* * * * *